(12) United States Patent
Matsuda

(10) Patent No.: US 6,493,956 B1
(45) Date of Patent: Dec. 17, 2002

(54) GAUGE FOR CALIBRATING THREE-DIMENSIONAL COORDINATE MEASURING MACHINE AND METHOD FOR CALIBRATING THREE-DIMENSIONAL COORDINATE MEASURING MACHINE USING THE GAUGE

(75) Inventor: Jiro Matsuda, Tsukuba (JP)

(73) Assignee: Agency of Industrial Science & Technology, Ministry of International Trade & Industry, Tokyo (JP)

( * ) Notice: Subject to any disclaimer, the term of this patent is extended or adjusted under 35 U.S.C. 154(b) by 0 days.

(21) Appl. No.: 09/464,383

(22) Filed: Dec. 16, 1999

(30) Foreign Application Priority Data

Dec. 17, 1998 (JP) .......................................... 10-359732

(51) Int. Cl.$^7$ ............................................... G01B 3/30
(52) U.S. Cl. ....................................................... 33/502
(58) Field of Search .................... 33/502, 567; 73/1.01, 73/1.79, 1.81

(56) References Cited

U.S. PATENT DOCUMENTS

| | | | | |
|---|---|---|---|---|
| 3,417,475 A | * | 12/1968 | Vlasaty ......................... | 33/502 |
| 4,364,182 A | * | 12/1982 | Jones .......................... | 73/1.79 |
| 4,523,450 A | * | 6/1985 | Herzog ......................... | 73/1.81 |
| 4,932,136 A | * | 6/1990 | Schmitz et al. ................. | 33/567 |
| 4,962,591 A | * | 10/1990 | Zeller et al. ................... | 33/502 |
| 5,187,874 A | * | 2/1993 | Takahashi et al. ............... | 33/502 |
| 5,647,136 A | * | 7/1997 | Jostlein ........................ | 73/1.79 |
| 5,671,541 A | * | 9/1997 | Dai et al. ...................... | 33/567 |
| 6,023,850 A | * | 2/2000 | Trapet .......................... | 33/502 |

FOREIGN PATENT DOCUMENTS

JP   1-064004   4/1989

* cited by examiner

Primary Examiner—G. Bradley Bennett
(74) Attorney, Agent, or Firm—Oblon, Spivak, McClelland, Maier & Neustadt, P.C.

(57) ABSTRACT

A CMM calibrating gauge includes a block gauge which has a first end face and an opposite second end face and whose length absolute value has been certified, and a sphere fixed to a front surface of the block gauge. A method for calibrating a CMM using the CMM calibrating gauge includes the steps of bringing a probe of the CMM into contact with the first end face of the block gauge to specify planarity of the first end face, bringing the probe into contact with the peripheral surface and the pole point of the sphere to specify coordinates of the center of the sphere relative to the first end face and the diameter of the sphere, bringing the probe into contact with the second end face of the block gauge to measure planarity of the second end face, and bringing the probe into contact with the peripheral surface and the pole point of the sphere to measure coordinates of the center of the sphere relative to the second end face and the diameter of the sphere and revise the specified planarity of the first end face and the specified sphere center coordinates and sphere diameter, thereby specifying three-dimensional dimensions of the CMM calibrating gauge to calibrating the CMM.

26 Claims, 4 Drawing Sheets

GAUGE FOR CALIBRATING THREE-DIMENSIONAL COORDINATE MEASURING MACHINE AND METHOD FOR CALIBRATING THREE-DIMENSIONAL COORDINATE MEASURING MACHINE USING THE GAUGE

BACKGROUND OF THE INVENTION

1. Field of the Invention

The present invention relates to a gauge for calibrating a three-dimensional coordinate measuring machine (hereinafter referred to as CMM), that is used in examining the accuracy of the CMM and to a method for calibrating the CMM using the gauge.

2. Description of the Prior Art

A CMM is a machine for measuring the dimensions and shape of a substance under measurement using coordinate points interspersed in a three-dimensional space with the aid of a computer. To be specific, the substance under measurement disposed on a surface plate and a probe attached to the tip of a Z-axis in the CMM are relatively moved in three-dimensional directions, moments of contact of the probe with the substance are ascertained, coordinate values in the directions of the moving axes are read using the moments as electrical triggers, and the dimensions and shape of the substance are measured using the computer.

Generally, CMMs are required to measure a substance with particularly high accuracy. In order to guarantee high-accuracy measurement, a CMM has to be subjected to accuracy examination before every use, and values obtained by the measurement with the CMM are calibrated using the accuracy examination results as calibration values or adjusting means is used to finely adjust the CMM. This accuracy examination requires use of a gauge as the standard. The gauge is required to enable evaluation of values detected by a CMM's probe when it is moved three-dimensionally.

A first important target for researchers was how the error of each axis in the CMM should be measured. Therefore, a gauge was first invented for the purpose of measuring such errors in the CMM. It is now widely known that, fundamentally, the errors should be measured by measuring a sphere or spheres. For this reason, research has turned to a second target of determining how the sphere or spheres should be disposed in what mode to form a gauge for measurement and evaluation. Various attempts have been made to dispose the spheres in one same plane and dispose them sterically.

A gauge of this type for calibrating a CMM is disclosed in JP-UM-A HEI-1-64004 and shown in FIG. 8. As shown, this gauge comprises a block body 51 in the form of a flat rectangular parallelepiped, a plurality of substantially cubic index projections 52 for accuracy examination arranged at regular intervals on the upper surface 51a along one end face 51b of the block body 51, and a plurality of substantially hemispherical projections 53 for repeated accuracy examination integrally formed at predetermined positions on the upper surface 51a of the block body 51. The accuracy examination is carried out by setting the block body 51 in place on a table for the CMM, bringing the probe of the CMM into contact successively with the index projections 52, for example, to read the indices of the CMM, and using the indices and the intervals between the projections 53 for repeated accurate examination to effect computation. Various kinds of gauges similar to the gauge mentioned above have been put to practical use for CMM calibration.

Although consideration has been given to how spheres should be disposed in one same plane and how spheres should be disposed three-dimensionally as described above, since no national standard for an intercentral distance of spheres has yet been established, the intercentral distance of spheres cannot be expressed in terms of submicrometer units irrespective of how the spheres are disposed. Only the intercentral distance of the spheres not expressed in submicrometer units and the diameters of the spheres obtained by calculation from the intercentral distance can be measured. In the conventional CMM calibrating gauge shown above, moreover, standard values are obtained by measuring the gauge parts as accurately as possible. Thus, the standard values are merely measured values inherently containing errors and therefore lack reliability.

In view of the above, the principal object of the present invention is to provide a CMM calibrating gauge that enables total calibration of errors in graduations of each axis and operational performance of CMMs.

Another object of the present invention is to provide a CMM calibrating gauge that enables a plurality of revisions of the measured values and accurate calibration of CMMs of any size.

Still another object of the present invention is to provide a CMM calibrating gauge easy to manage, store and maintain.

Yet another object of the present invention is to provide a method for specifying the three-dimensional dimensions of a CMM calibrating gauge with high accuracy and for accurately calibrating a CMM including the motion characteristics of the CMM in a specific direction.

SUMMARY OF THE INVENTION

To attain the objects described above, the present invention provides a CMM calibrating gauge having a fundamental structure that comprises a block gauge having a pair of opposite end faces whose absolute length values have been certified and at least one sphere fixed to a front surface of the block gauge.

The at least one sphere may be a plurality of spheres. These spheres may have different sizes. One or more spheres may also be fixed to the back surface of the block gauge.

The CMM calibrating gauge can be used alone or in combination with an optional number of like block gauges and/or an optional number of like CMM calibrating gauges connected at their respective end faces.

The present invention further provides a method for calibrating a CMM using the CMM calibrating gauge of the fundamental structure, which comprises the steps of bringing a probe of the CMM into contact with a first end face of the block gauge of the CMM calibrating gauge to specify planarity of the first end face, bringing the probe into contact with a peripheral surface and a pole point of the sphere to specify coordinates of a sphere center relative to the first end face and a diameter of the sphere, bringing the probe of the CMM into contact with a second end face of the block gauge of the CMM calibrating gauge to measure planarity of the second end face, bringing the probe into contact with the peripheral surface and the pole point of the sphere to measure coordinates of the sphere center relative to the second end face and the diameter of the sphere and revise the specified planarity of the first end face and the specified sphere center coordinates and sphere diameter, thereby specifying three-dimensional dimensions of the CMM calibrating gauge to calibrate the CMM.

When a combination CMM calibrating gauge comprising the aforementioned CMM calibrating gauge and an optional number of like block gauges and/or an optional number of like CMM calibrating gauges is used, the three-dimensional dimensions of the combination CMM calibrating gauge and the CMM including its motion characteristic in a specific direction can be calibrated with higher accuracy.

The above and other objects, features and advantages of the present invention will become apparent from the description given hereinbelow with reference to the accompanying drawings.

BRIEF DESCRIPTION OF THE DRAWINGS

FIG. 7($b$) is a plan view showing the CMM calibrating gauge of FIG. 7($a$).

DESCRIPTION OF THE PREFERRED EMBODIMENTS

Figure 1:
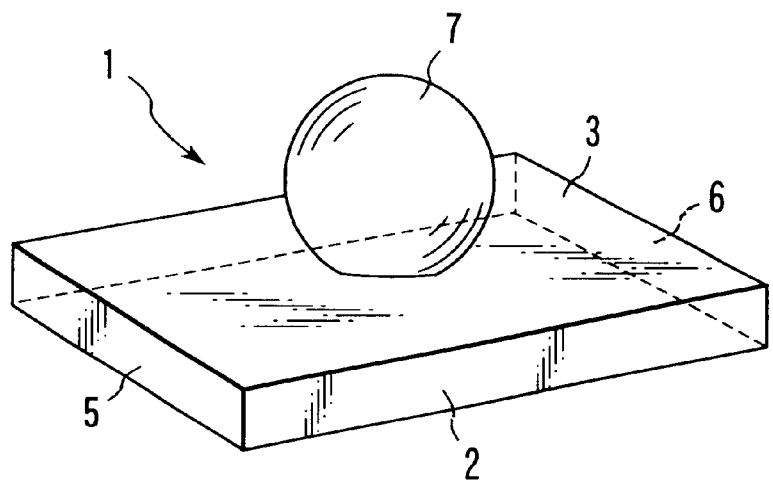
FIG. 1 is a perspective view showing the fundamental structure of a CMM calibrating gauge according to the present invention.

FIG. 1 shows the fundamental structure of a CMM calibrating gauge 1 according to one embodiment of the present invention, which comprises a block gauge 2 and an integral sphere 7. As is widely known, the block gauge 2 is a national standard whose end face length absolute value has been certified by a lightwave interferometer. The end faces of the block gauge 2 whose length absolute values have been certified are denoted by reference numeral 5 (the first end face) and reference numeral 6 (the second end face). The remaining faces of the block gauge 2 are hereinafter called the front surface 3, the back surface 4 and side surfaces. A sphere 7 is disposed on the front surface 3 of the block gauge 2. This can be done by various means such as by forming a substantially spherical recess on the front surface 3 of the block gauge 2 and fitting a sphere 7 in the recess or by fixing a sphere 7 to the front surface 3 by means of welding or an adhesive agent. The size of the sphere 7 is not particularly defined, but its diameter is smaller than the length of the block gauge 2. The position of the sphere 7 on the front surface 3 of the block gauge 2 is not particularly defined, either, except that the spherical surface must not protrude from the end faces or side surfaces.

Figure 2:
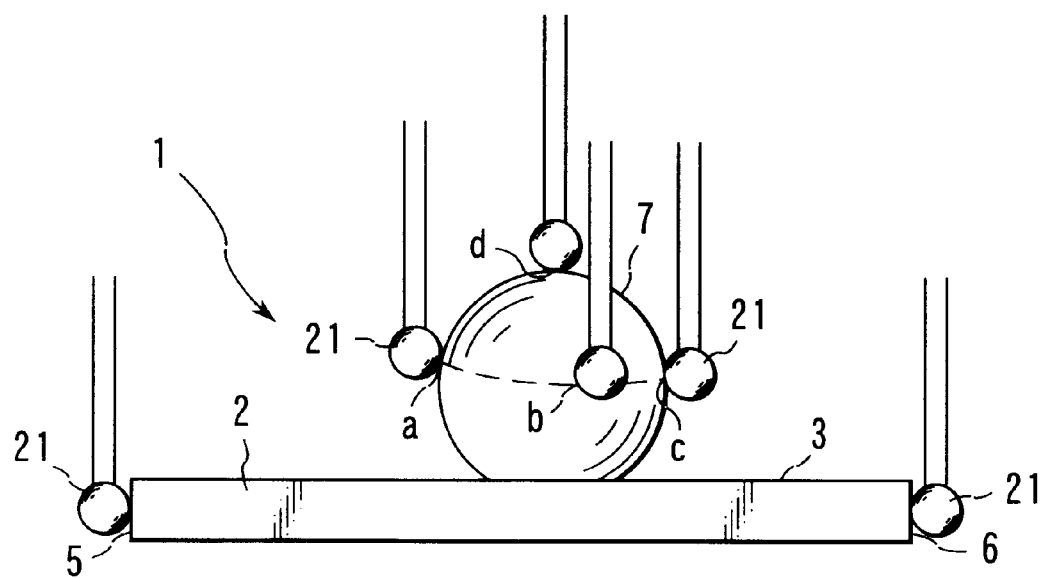
FIG. 2 is an explanatory view showing a method of using the CMM calibrating gauge of FIG. 1.

A method for calibrating a CMM using the CMM calibrating gauge 1 having the fundamental structure of the combined block gauge 2 and sphere 7 will be described with reference to FIG. 2.

A probe 21 of a CMM (not shown) is brought into contact with the first end face 5 at at least three optional points to measure and define the planarity of the first end face 5 and then with the opposite second end face 6 at at least three optional points to measure and define the planarity of the second end face 6. The values of the block gauge 2 measured by the CMM are compared with the real values of the block gauge 2 to calibrate the graduations of the CMM. Since the block gauge 2 is a national standard, the graduations are calibrated with extremely high accuracy.

The probe 21 is then brought into contact with at least three arbitrary points a, b and c on the X-Y plane that is the equator surface of the sphere 7 fixed to the block gauge 2 to acquire the coordinate positions of the at least three arbitrary points. Finally, the probe 21 is brought into contact with the pole point d of the sphere 7 to acquire the coordinate position of the pole point. By these measurements and through a mathematical calculation process, the coordinates of the center of the sphere 7 and the diameter of the sphere 7 can be obtained. Both the distance between the sphere center and the first end face 5 of the block gauge 2 and the distance between the sphere center and the second end face 6 of the block gauge 2 can also be obtained. On the basis of the two distance values, the measured value of the coordinates of the sphere center can be calibrated.

Figure 3:
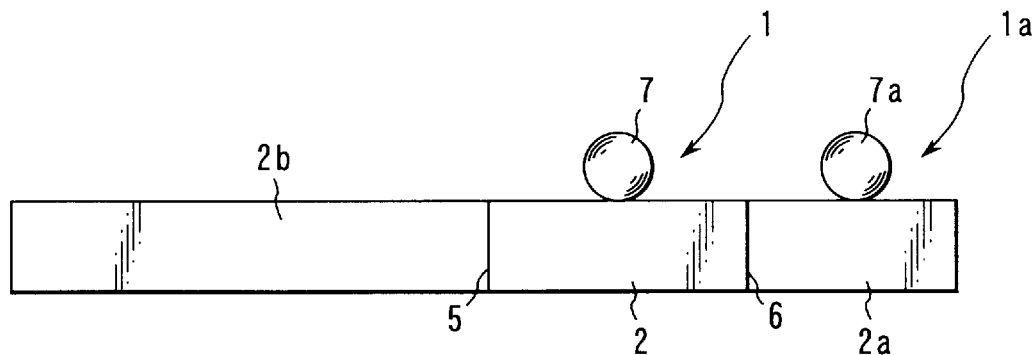
FIG. 3 is a front view showing a combination of the CMM calibrating gauge of FIG. 1 with a same type of CMM calibrating gauge and a block gauge.

FIG. 3 shows another embodiment of the CMM calibrating gauge according to the present invention, which comprises the CMM calibrating gauge 1 of FIG. 1, a block gauge 2$b$ firmly attached to the first end face 5 of the block gauge 2 of the CMM calibrating gauge 1, and a second CMM calibrating gauge 1$a$ firmly attached to the second end face 6 of the block gauge 2 of the CMM calibrating gauge 1. In the second CMM calibrating gauge 1$a$, similarly to the CMM calibrating gauge 1, the calibrated values of the coordinates of the center of a sphere 7$a$ on a block gauge 2$a$ and the diameter of the sphere 7$a$ have been obtained.

In the combination of the CMM calibrating gauge 1 with the block gauge 2$b$, the aforementioned calibrated values of the coordinates of the center of the sphere 7 and the diameter of the sphere 7 are further calibrated utilizing the first end face of the block gauge 2$b$ to obtain more accurate values.

Also in the combination of the CMM calibrating gauge 1 with the second CMM calibrating gauge 1$a$, the positions of the centers of the spheres 7 and 7$a$ and the intercentral distance of the spheres 7 and 7$a$ are calibrated utilizing the second end face of the second CMM calibrating gauge 1$a$, thereby ascertaining the coordinates of the spheres 7 and 7$a$ in the three-dimensional space more clearly. While the spheres 7 and 7$a$ have the same diameter in the embodiment of FIG. 3, they may have different diameters.

Figure 4:
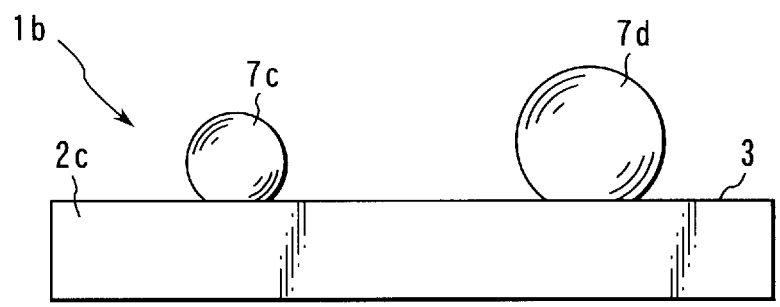
FIG. 4 is a front view showing another embodiment of the CMM calibrating gauge according to the present invention.

While in the embodiment of FIG. 1 the CMM calibrating gauge 1 having a single sphere 7 fixed to the front surface 3 of the block gauge 2, FIG. 4 shows a CMM calibrating gauge 1$b$ according to another embodiment comprising a block gauge 2$c$ and a small-diameter sphere 7$c$ and a large-diameter sphere 7$d$ disposed on and fixed to the front surface 3 of the block gauge 2$c$. The coordinates of the centers of the spheres 7$c$ and 7$d$ are calibrated by obtaining the distances between the sphere centers and the opposite end surfaces of the block gauge 2$c$. As a result, the intercentral distance of the spheres 7$c$ and 7$d$ in the CMM calibrating gauge 1$b$ is clearly determined. While the spheres 7$c$ and 7$d$ have different diameters in the embodiment of FIG. 4, they may have the same diameter.

Figure 5:
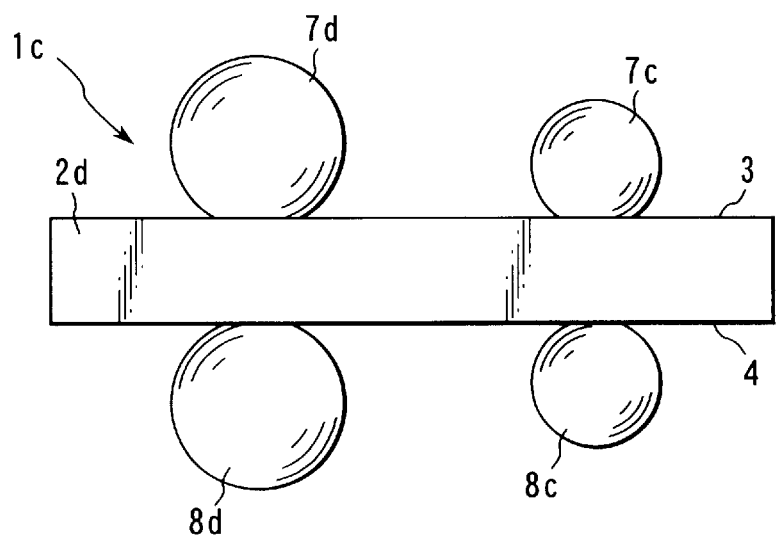
FIG. 5 is a front view showing a further embodiment of the CMM calibrating gauge according to the present invention.

While the CMM calibrating gauge 1$b$ in the embodiment of FIG. 4 comprises the block gauge 2$c$ and the two spheres 7$c$ and 7$d$ of different diameters provided on the front surface 3 of the block gauge 2$c$, a CMM calibrating gauge 1c in the embodiment of FIG. 5 is further provided on the back surface 4 of a block gauge 2d with a small-diameter sphere 8c and a large-diameter sphere 8d. This CMM calibrating gauge 1c is used with one end face of the block gauge 2d disposed on a surface plate.

Figure 6:
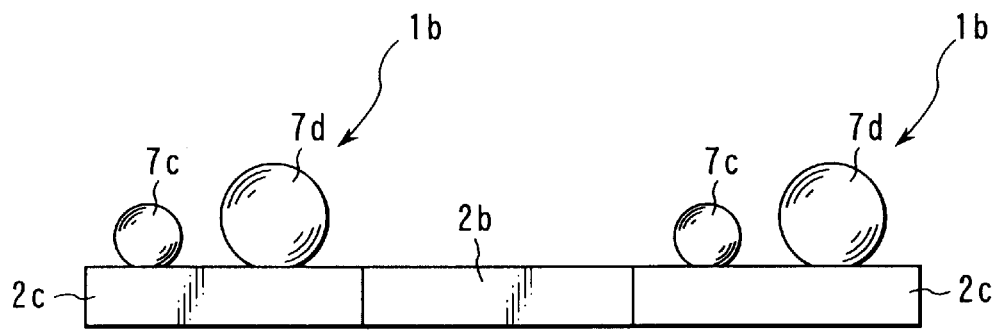
FIG. 6 is a front view showing a combination of two CMM calibrating gauges of FIG. 4 with a block gauge.

A CMM calibrating gauge in the embodiment of FIG. 6 comprises two CMM calibrating gauges 1b shown in FIG. 4 and the block gauge 2b of FIG. 3 interposed therebetween and is disposed on a surface plate.

By thus using plural numbers of gauges, more accurate calibration of CMMs of any size can be carried out. A large-sized CMM can be calibrated, without need of fabricating a specially large-sized CMM calibrating gauge, by fabricating and combining a suitable number of small-sized CMM calibrating gauges and block gauges. Owing to their small size, therefore, these gauges are easy to manage, store and maintain.

A CMM calibrating gauge in the embodiment of FIG. 7 comprises the CMM calibrating gauge 1 of FIG. 1 having the sphere 7 fixed on the block gauge 2, a second block gauge 9a and a third block gauge 9b, both of a height larger than the radius of the sphere 7, fixed to the opposite end faces 5 and 6 of the block gauge 2, respectively, the block gauge 2b fixed to the end face of the second block gauge 9a, the second CMM calibrating gauge 1a, with the sphere 7a of the same diameter as the sphere 7 fixed to its block gauge 2a, fixed to the end face of the third block gauge 9b, and a fourth block gauge 10a and a fifth block gauge 10b, both of the same height as the second and third block gauges 9a and 9b, fixed to the end face of the block gauge 2b and the end face of the block gauge 2a of the second CMM calibrating gauge 1a, respectively.

Figure 7A:
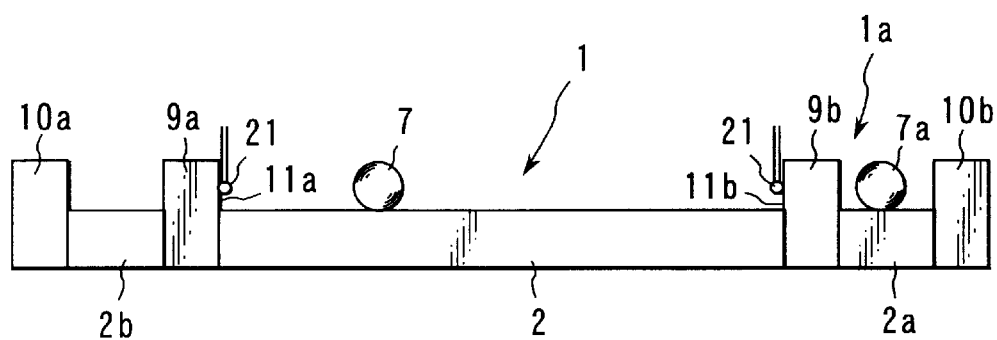
FIG. 7($a$) is a front view showing another method of using the CMM calibrating gauge according to the present invention.
Figure 7B:
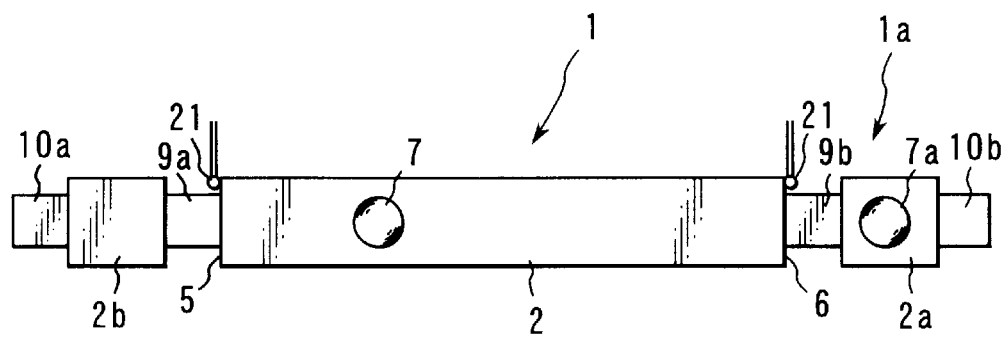
Figure 8:
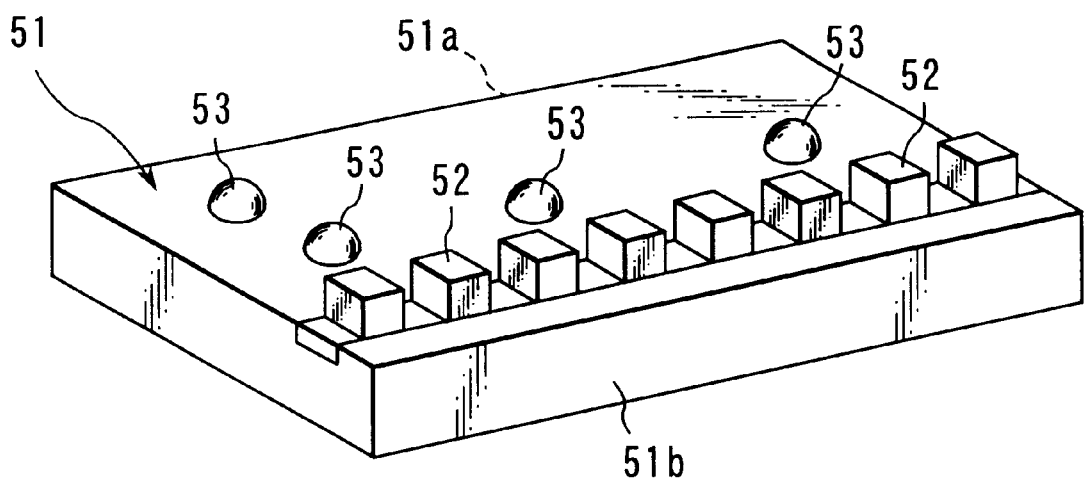
FIG. 8 is a perspective view showing a conventional CMM calibrating gauge.

The calibration of a CMM is carried out using the CMM calibrating gauge of this embodiment by first bringing a probe 21 of the CMM into contact with the first end face 5 of the block gauge 2 of the CMM calibrating gauge 1 as shown in the plan view of FIG. 7(b) at least three points to measure and define the planarity of the first end face 5 from a mathematical calculation process of the coordinates of the three points and then bringing the probe 21 into contact with the first end face 11b of the third block gauge 9b as shown in FIG. 7(a) at one point of a height substantially the same as the radius of the spheres 7 and 7a. The first end face 11b is on the left side of the third block gauge 9b similarly to the first end face 5 on the left side of the block gauge 2 of the first CMM calibrating gauge 1 with which the probe 21 of the CMM has first been brought into contact. Therefore, the direction of the movement of the probe 21 is a specific direction of the CMM. Further, since the probe movement is at the same height as the centers of the spheres 7 and 7a, the CMM in the specific direction can be accurately calibrated according to Abbe's principle that it is possible to make accurate measurement without being adversely affected by the inclination of a measurement surface when measurement points are linearly arranged.

The probe 21 is then brought into contact with the second end face 6 on the right side of the block gauge 2 of the first CMM calibrating gauge 1 at three points to measure and define the planarity of the second end face 6. Thereafter, the probe 21 is brought into contact with the second end face 11a on the right side of the second gauge 9a at one point at substantially the same height as the centers of the spheres 7 and 7a. Since the second end face 11a is on the right side of the second gauge 9a similarly to the second end face 6 on the right side of the block gauge 2 of the first CMM calibrating gauge 1 and the contact point is at the same height as the centers of the spheres 7 and 7a, the CMM in another specific direction can be accurately calibrated. On the basis of the difference between the length between the first end faces 5 and 11b and the length between the second end faces 6 and 11a, obtained by the aforementioned operation, accurate calibration of the CMM in the two specific directions including its movement performance can be carried out. By further measuring the periphery of each sphere at the height of the sphere center and the pole point of each sphere, calibration of the CMM in the three-dimensional directions can be accurately carried out. If the same operation as mentioned above is effected relative to the fourth and fifth block gauges 10a and 10b, still more accurate calibration can be attained.

The present invention is not limited to the embodiments described above. Various CMMs can be calibrated by combining the CMM calibrating gauge of the fundamental structure having a sphere fixed to a block gauge with a suitable number of CMM calibrating gauges and/or blocking gauges.

As has been described in the foregoing, since the CMM calibrating gauge according to the present invention comprises a block gauge that is a national standard whose length absolute value has been certified by a lightwave interferometer and a sphere fixed to the block gauge, the coordinates of the center of the sphere and the diameter of the sphere can be specifically measured on the basis of the opposite end faces of the block gauge, and the measured values are very accurate. Therefore, the CMM calibrating gauge has high precision. The number of the spheres is not limited to one. By fixing a plurality of spheres of different sizes to the block gauge, various CMMs can be calibrated. Furthermore, the CMM calibrating gauge of the present invention having a plurality of block gauges fixed thereto enables measured values to be revised a plurality of times, and the calibration of CMMs of any size can be attained by a combination of a plurality of small-sized gauges, in which case the gauges are easy to manage, store and maintain.

In addition, the CMM calibrating method according to the present invention can be performed using any one of the CMM calibrating gauges shown in the accompanying drawings and enables the three-dimensional dimensions of the CMM calibrating gauges to be accurately specified and CMMs to be accurately calibrated. Furthermore, the CMM calibrating gauge, when combined with a plurality of CMM calibrating gauges of the same type and/or block gauges, enables the three-dimensional sizes of the resultant CMM calibrating gauge to be specified more accurately and CMMs including their movement characteristics in the specific directions to be calibrated more accurately.

What is claimed is:

1. A CMM calibrating gauge comprising a block gauge which has a first end face and an opposite second end face and whose length absolute value has been certified, and at least one sphere fixed to a front surface of said block gauge.

2. A CMM calibrating gauge according to claim 1, wherein said at least one sphere comprises a plurality of spheres.

3. A CMM calibrating gauge according to claim 2, wherein said plurality of spheres have different sizes.

4. A CMM calibrating gauge according to claim 1, further comprising at least one additional sphere fixed to a back surface of said block gauge.

5. A CMM calibrating gauge according to claim 2, further comprising at least one additional sphere fixed to a back surface of said block gauge.

6. A CMM calibrating gauge according to claim 3, further comprising at least one additional sphere fixed to a back surface of said block gauge.

7. A CMM calibrating gauge according to claim 1, further comprising another block gauge fixed to the first end face of said block gauge.

8. A CMM calibrating gauge according to claim 2, further comprising another block gauge fixed to the first end face of said block gauge.

9. A CMM calibrating gauge according to claim 3, further comprising another block gauge fixed to the first end face of said block gauge.

10. A CMM calibrating gauge according to claim 4, further comprising another block gauge fixed to the first end face of said block gauge.

11. A CMM calibrating gauge according to claim 5, further comprising another block gauge fixed to the first end face of said block gauge.

12. A CMM calibrating gauge according to claim 6, further comprising another block gauge fixed to the first end face of said block gauge.

13. A CMM calibrating gauge according to claim 1, further comprising at least one CMM calibrating gauge of same type combined with the first end face and the second end face of said block gauge.

14. A CMM calibrating gauge according to claim 2, further comprising at least one CMM calibrating gauge of same type fixed to the first end face and the second end face of said block gauge.

15. A CMM calibrating gauge according to claim 3, further comprising at least one CMM calibrating gauge of same type fixed to the first end face and the second end face of said block gauge.

16. A CMM calibrating gauge according to claim 4, further comprising at least one CMM calibrating gauge of same type fixed to the first end face and the second end face of said block gauge.

17. A CMM calibrating gauge according to claim 5, further comprising at least one CMM calibrating gauge of same type fixed to the first end face and the second end face of said block gauge.

18. A CMM calibrating gauge according to claim 6, further comprising at least one CMM calibrating gauge of same type fixed to the first end face and the second end face of said block gauge.

19. A CMM calibrating gauge according to claim 1, further comprising a CMM calibrating gauge of same type fixed to the first end face of said block gauge and another block gauge fixed to the second end face of said block gauge.

20. A CMM calibrating gauge according to claim 2, further comprising a CMM calibrating gauge of same type fixed to the first end face of said block gauge and another block gauge fixed to the second end face of said block gauge.

21. A CMM calibrating gauge according to claim 3, further comprising a CMM calibrating gauge of same type fixed to the first end face of said block gauge and another block gauge fixed to the second end face of said block gauge.

22. A CMM calibrating gauge according to claim 4, further comprising a CMM calibrating gauge of same type fixed to the first end face of said block gauge and another block gauge fixed to the second end face of said block gauge.

23. A CMM calibrating gauge according to claim 5, further comprising a CMM calibrating gauge of same type fixed to the first end face of said block gauge and another block gauge fixed to the second end face of said block gauge.

24. A CMM calibrating gauge according to claim 6, further comprising a CMM calibrating gauge of same type fixed to the first end face of said block gauge and another block gauge fixed to the second end face of said block gauge.

25. A method for calibrating a CMM using any one of the CMM calibrating gauges according to claims 1 to 6, comprising the steps of:

bringing a probe of the CMM into contact with the first end face of said block gauge to specify planarity of the first end face;

bringing the probe into contact with a peripheral surface and a pole point of said sphere to specify coordinates of a center of said sphere relative to the first end face and a diameter of said sphere;

bringing the probe into contact with the second end face of said block gauge to measure planarity of the second end face; and bringing the probe into contact with the peripheral surface and the pole point of said sphere to measure coordinates of the center of said sphere relative to the second end face and the diameter of said sphere and revise the specified planarity of the first end face and the specified sphere center coordinates and sphere diameter, thereby specifying three-dimensional dimensions of said CMM calibrating gauge to calibrate the CMM.

26. A method for calibrating a CMM using any one of the CMM calibrating gauges according to claims 7 to 24, comprising the steps of:

bringing a probe of the CMM into contact with the first end face of said block gauge to specify planarity of the first end face;

bringing the probe into contact with a peripheral surface and a pole point of said sphere to specify coordinates of a center of said sphere relative to the first end face and a diameter of said sphere;

bringing the probe into contact with the second end face of said block gauge to measure planarity of the second end face;

bringing the probe into contact with the peripheral surface and the pole point of said sphere to measure coordinates of the center of said sphere relative to the second end face and the diameter of said sphere and revise the specified planarity of the first end face and the specified sphere center coordinates and sphere diameter, thereby specifying three-dimensional dimensions of said CMM calibrating gauge to calibrate the CMM;

bringing the probe into contact with an end face of said another block gauge or an end face of a block gauge of said at least one CMM calibrating gauge to measure planarity of the end face; and bringing the probe into contact with the peripheral surface and the pole point of the sphere to measure coordinates of the center of said sphere relative to the end face of said another block gauge or the end face of the block gauge of said at least one CMM calibrating gauge and the diameter of said sphere and further revise the revised planarity of the end face and the specified sphere center coordinates and sphere diameter, thereby specifying three-dimensional dimensions of said CMM calibrating gauge to calibrate the CMM.

* * * * *